United States Patent [19]

Tuckey

[11] Patent Number: 5,001,934
[45] Date of Patent: Mar. 26, 1991

[54] SOLID STATE PRESSURE SENSOR

[75] Inventor: Charles H. Tuckey, Cass City, Mich.

[73] Assignee: Walbro Corporation, Cass City, Mich.

[21] Appl. No.: 459,951

[22] Filed: Jan. 2, 1990

[51] Int. Cl.$^5$ .............................................. G01L 9/06
[52] U.S. Cl. ...................................... 73/721; 73/727; 338/4
[58] Field of Search ............... 73/721, 720, 727, 726; 338/4

[56] References Cited

U.S. PATENT DOCUMENTS 4,411,158  10/1983  Schaff .................................... 73/721
4,790,192  12/1988  Knecht et al. ........................... 338/4

FOREIGN PATENT DOCUMENTS 0092634  4/1989  Japan ..................................... 73/720

Primary Examiner—Donald O. Woodiel
Attorney, Agent, or Firm—Barnes, Kisselle, Raisch, Choate, Whittemore & Hulbert

[57] ABSTRACT

A solid state pressure sensor that includes a silicon body having a circumferentially continuous annular periphery and an imperforate central diaphragm bridging the periphery in an integral monolithic construction that is circumferentially symmetrical about the axis of the periphery. Strain gauge sensors are deposited on the body so as to form an integral assembly with the body, and are constructed and arranged to provide electrical signals as a function of flexure of the central diaphragm with respect to the periphery of the body. A pair of fittings are bonded to the body periphery on opposite sides of the diaphragm. Each fitting forms a hermetically sealed fluid cavity on an associated side of the diaphragm, with each such cavity being circumferentially symmetrical with respect to the central axis of the sensor.

13 Claims, 2 Drawing Sheets

SOLID STATE PRESSURE SENSOR

The present invention is directed to a solid state pressure sensor that finds particular utility in pressureresponsive engine fuel delivery control systems and the like.

BACKGROUND AND OBJECTS OF THE INVENTION

There are numerous applications in commerce and industry in which compact, economical, efficient and sealed pressure sensors find utility. For example, U.S. Pat. Nos. 4,728,264 and 4,789,308, and U.S. Application Ser. Nos. 07/324,649 and 07421,810, disclose fuel delivery systems for internal combustion engines in which a pressure sensor is responsive to fuel pressure for modulating application of current to the fuel pump motor. Automotive fuels can be particularly corrosive, and it is therefore important that the pressure sensor access to the fuel line be properly sealed. One can envision numerous other instances in which a fluid pressure sensor must be sealed against leakage—e.g., sensing pressure of environmentally hazardous liquids and gases.

It is therefore a general object of the present invention to provide a pressure sensor that is compact, that is economical to fabricate, that has a minimum number of component parts, and that yields reliable service over an extended operating lifetime Another and more specific object of the invention is to provide a pressure sensor of solid state construction that employs conventional silicon microstructure manufacturing technology.

SUMMARY OF THE INVENTION

A solid state pressure sensor in accordance with the present invention comprises a silicon body having a periphery for mounting the body to support structure, and a central flexible diaphragm that, together with the periphery, forms an integral monolithic structure. Strain gauge sensors are mounted on the silicon body for providing electrical signals as a function of flexure of the diaphragm A pair of fittings are sealingly bonded to the body periphery on opposite sides of the diaphragm, with each of the fittings cooperating with the body to form a sealed fluid cavity on an associated side of the diaphragm. The sensors provide electrical signals as a function of a pressure differential between the cavities and resulting flexure of the diaphragm. Preferably, the strain gauge sensors comprise piezo-resistive elements deposited on the body so as to form an integral structure with the body. The fittings preferably are of PYREX® glass composition anodic- or fusion-bonded to the body.

In the preferred embodiment of the invention, the silicon body has a circumferentially continuous annular periphery and a thin imperforate central diaphragm bridging the periphery so that the body is circumferentially symmetrical about the axis of the annular periphery The diaphragm and periphery have a common planar surface on which the sensors are deposited, together with appropriate leads that extend from the sensors to the periphery of the body through an adjacent joint between the surface and one of the fittings A housing externally surrounds the body, and encloses the body and at least a portion of the fittings. Electrical terminals are carried by the housing and are connected to the leads at the body periphery. The housing in the preferred embodiment of the invention comprises a pair of opposed cup-shaped sections bonded to each other.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
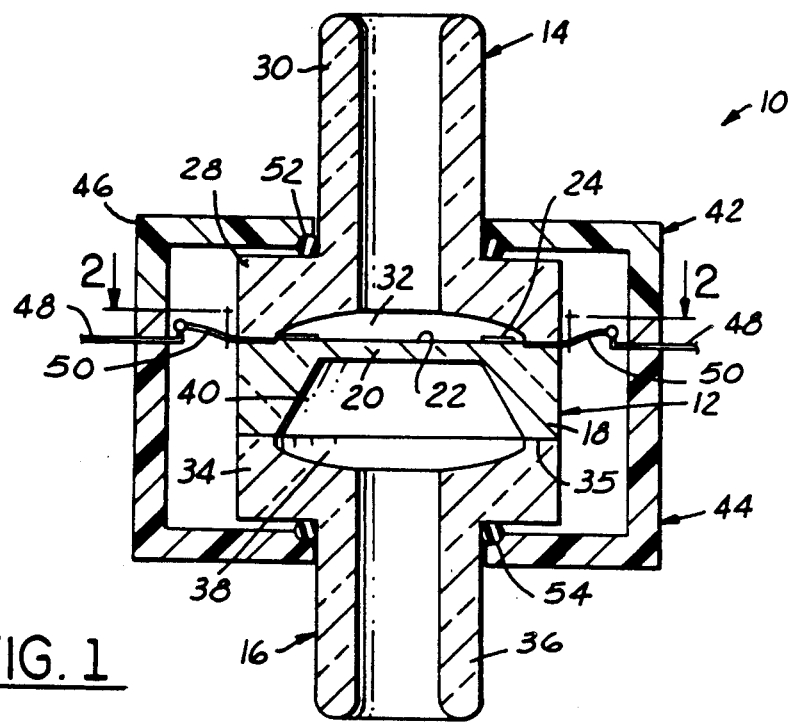
FIG. 1 an elevational view that bisects a solid state pressure sensor in accordance with one presently preferred embodiment of the invention.

A solid state pressure sensor 10 in accordance with a presently preferred embodiment of the invention comprises a cup-shaped body 12 of monolithic silicon construction sandwiched between a pair of fluid fittings 14,16. Body 12 includes a circumferentially continuous annular shoulder 18 and a thin imperforate base 20 bridging shoulder 18. Shoulder 18 and base 20 share a common axially-facing planar surface 22. A series of piezo-resistive sensor elements 24 are deposited on surface 22, and are connected by suitable conductive leads 26, also deposited on surface 22, to each other and to the periphery of body 12 for connection to external circuitry Elements 24 and leads 26 are covered by a protective layer of glass or the like. Monolithic body 12 with integral sensor elements and leads may be formed using conventional integrated circuit technology as described, for example, in Knutti, "Silicon Microstructure Sensors," published by IC Sensors, Inc. (1988).

Fitting 14 includes a base 28 and a hollow neck 30 coaxial with body 12. Within base 28, the passage of neck 30 opens into a cavity 32 opposed to and symmetrical with base 20 and enclosing sensor elements 24 Likewise, fitting 16 includes a base 34 bonded to the planar end surface 35 of shoulder 18, a hollow neck 36 and an internal cavity 38 opposed to the internal pocket 40 of body 12. Preferably fittings 14,16 are identical and of PYREX® glass or, less preferably, silicon construction. Each fitting is anodically bonded or fusion-bonded to the opposing planar surface of body 12, coaxially with the central axis of the body, to form an in-line pressure sensor in which the respective fluid cavities are hermetically sealed by the anodic or fusion bonds between the fittings and the silicon body.

A housing 42 encloses the central portion of sensor 10, including body 12 and the bases 28,34 of fittings 14,16. Housing 42 preferably takes the form of an opposed pair of cup-shaped housing segments 44,46 of molded plastic construction or the like. A circumferential array of electrical terminals 48 are insert-molded into housing body 44 adjacent to the open edge thereof, and are connected by suitable conductors 50 to leads 26 at the periphery of body 12. Each of the housing segments 44,46 includes a central opening that is received in assembly over the necks 30,36 of fittings 14,16 so as to capture associated O-rings 52,54 between the housing sections and the opposing fittings The opposed edges of housing segments 44,46 are suitably bonded to each other so as to form a complete sealed sensor.

Figure 3:
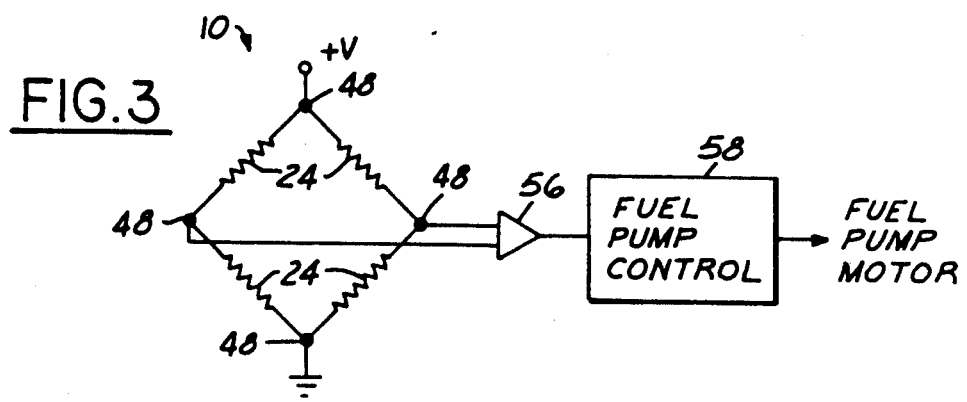
FIG. 3 is an electrical schematic diagram of the sensor connected to external fuel pump control circuitry in accordance with a presently preferred implementation of the invention.
Figure 4:
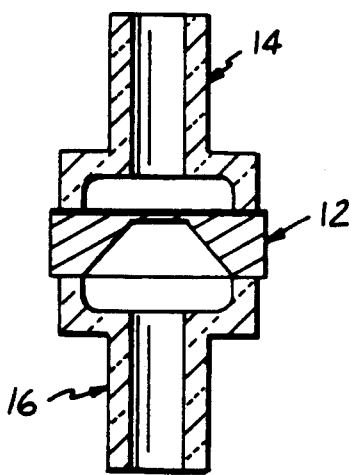
FIGS. 4–7 are elevational views that bisect a solid state pressure sensor in accordance with another presently preferred embodiment of the invention at successive stages of manufacture.
Figure 5:
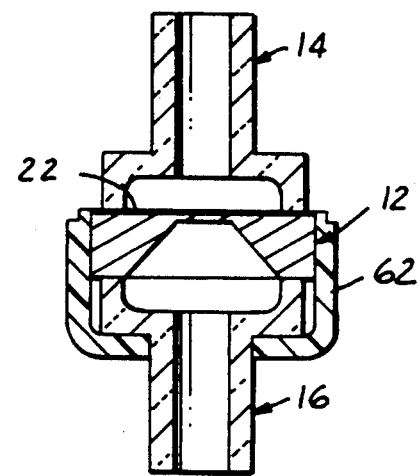

FIG. 3 is an electrical schematic diagram that illustrates elements 24 of sensor 10 connected in an electrical bridge arrangement through a differential amplifier 56 to suitable fuel pump control electronics 58 in a presently preferred implementation of the invention for applying current to a fuel pump motor as a function of fuel pressure in the delivery system. Neck 36 of fitting 16, for example, may be connected to the high-pressure output side of the fuel pump, and fitting 14 may be connected to air at ambient pressure or engine air manifold pressure Base 20 of silicon body 12 thus forms a diaphragm that flexes as a function of the pressure differential between the fuel delivery line and ambient or manifold air pressure Such diaphragm flexure is detected through unbalance of the bridge circuit in FIG. 3 so as to apply current to the fuel pump to maintain a predetermined constant pressure differential across sensor 10, or such other pressure characteristic as may be desired.

Figure 2:
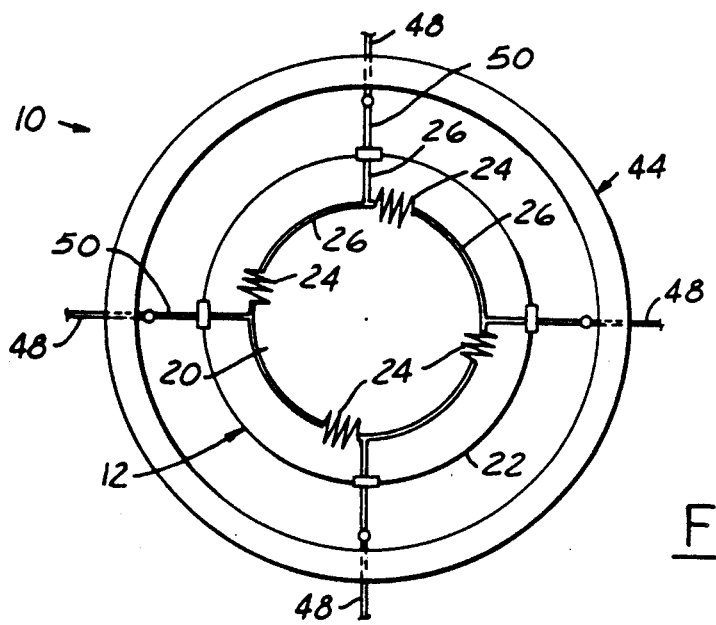
FIG. 2 is a sectional view taken substantially along the line 2—2 in FIG., 1.
Figure 6:
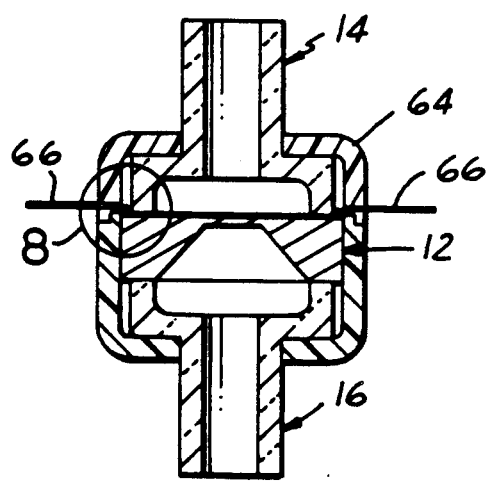
Figure 7:
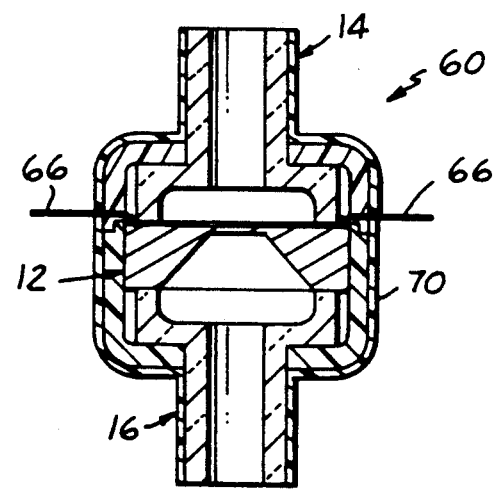
Figure 8:
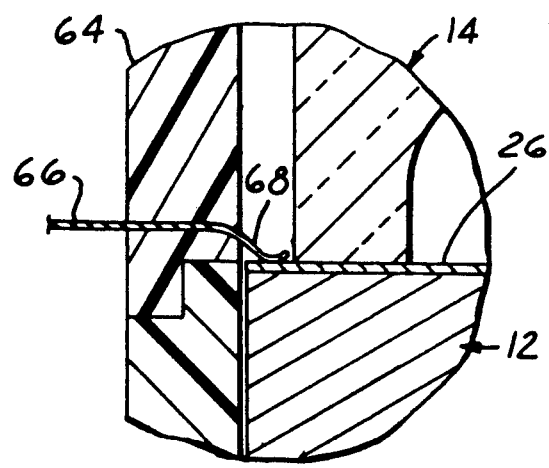
FIG. 8 is a fragmentary view of a portion of FIG. 6 on an enlarged scale.

FIGS. 4-8 illustrate successive stages manufacture of a second presently preferred embodiment 60 (FIG. 7) of the invention. Initially (FIG. 4), fittings 14-18 are anodic- or fusion-bonded to body 12 as previously described. Next (FIG. 5), a first cup-shaped housing section 62 of plastic or other suitable construction is placed over fitting 16 and body 12 so that its open edge is coplanar with the upper surface 22 of body 12. A second cup-shaped housing section 64 (FIGS. 6 and 8) is placed over fitting 14 so that its open edge abuts the open edge of section 62. Preferably, shoulders at the respective edges of housing sections 62,64 internest, as best seen in FIG. 8. Terminals 66 are insert molded into housing section 64 adjacent to the open edge thereof so that, when the housing sections are assembled as shown in FIGS. 6 and 8, the inner ends of terminals 66 form arcuate spring contacts 68 (FIG. 8) that are resiliently biased into abutting electrical and mechanical engagement with the leads 26 deposited on body 12. Thus, there is no need for the separate electrical conductors 50 as in the embodiment of FIGS. 1-2. Finally (FIG. 7), a cover 70 of plastic or other suitable construction is insert molded over housing sections 62,64 and the exposed necks of fittings 14,16 in sealing engagement therewith so as to form a closed sealed sensor assembly 60. Thus, the necessity for O-rings 52,54 in the embodiment of FIGS. 1-2 is likewise eliminated.

Although the preferred embodiments of the invention has been described in detail in conjunction with a fuel pressure sensor for use in an engine fuel delivery system, it will be appreciated that the solid state sensor of the present invention finds a wide variety of other potential applications. Indeed, the hermetically sealed construction of the pressure sensor makes the sensor particularly useful in conjunction with a variety of fluids, such as hazardous waste, radioactive gas, poisonous liquids or gases in chemical processes, etc.

I claim:

1. A solid state pressure sensor that comprises:
a silicon body having a circumferentially continuous annular peripheral portion and an imperforate central portion bridging said peripheral portion and thinner than said peripheral portion, said body being of integral monolithic construction that is circumferentially symmetrical about the axis of said peripheral portion,
strain gauge sensor means deposited on said body so as to form an integral assembly with said body, and being constructed and arranged to provide electrical signals as a function of flexure of said central portion with respect to said peripheral portion,
a pair of fittings bonded to said body peripheral portion on opposite sides of said central portion, each of said fittings including means cooperating with said body to form a sealed fluid cavity on an associated side of said central portion, each of said cavities being circumferentially symmetrical with respect to said axis,
electrical leads deposited on said body and extending to a radial edge of said body for connecting said sensor means to external circuitry, said central and peripheral portions of said body having a common planar surface, said sensor means being positioned on said surface so as to be disposed within one of said cavities, said leads being on said surface and extending through an adjacent joint between said surface and one of said fittings, and
a housing externally surrounding said body and enclosing said body and at least a portion of said fittings, electrical terminal means on said housing and means connecting said terminal means to said leads, said fittings being identical and including respective necks extending coaxially with said axis, said housing including means sealingly embracing said necks.

2. The sensor set forth in claim 1 wherein said fittings are of composition selected from the group consisting of silicon and glass.

3. The sensor set forth in claim 2 wherein said fittings are of PYREX ® glass composition.

4. The sensor set forth in claim 2 wherein said fittings are anodic- or fusion-bonded to said body.

5. The sensor set forth in claim 1 wherein said housing comprises a pair of opposed cup-shaped structures bonded to each other with sealing means captured between said flange means and said fittings.

6. The sensor set forth in claim 10 wherein said housing comprises a pair of opposed cup-shaped structures bonded to each other, and an external cover sealingly embracing said structures and said necks.

7. The sensor set forth in claim 1 wherein said connecting means comprises spring contacts on said terminal means resiliently abutting said leads.

8. A solid state pressure sensor that comprises:
a silicon body having a circumferentially continuous annular peripheral portion and an impertorate central portion bridging said peripheral portion and thinner than said peripheral portion, said peripheral portion and thinner than said peripheral portion, said body being of integral monolithic construction that is circumferentially symmetrical about the axis of said peripheral portion,
strain gauge sensor means deposited on said body so as to form an integral assembly with said body, and being constructed and arranged to provide electrical signals as a function of flexure of said central portion with respect to said peripheral portion, and
a pair of one-piece fittings of composition selected from the group consisting of silicon and glass anodic-bonded fusion-bonded to said body peripheral portion of opposite sides of said central portion, each of said fittings including means circumferentially surrounding said central portion of said body and cooperating with said body to form a sealed fluid cavity on an associated side of said central portion and a hollow neck extending from the associated said cavity and having an open end remote from the cavity for admitting fluid to the cavity, each of said cavities being circumferentially symmetrical with respect to said axis.

9. The sensor set forth in claim 8 further comprising electrical leads deposited on said body and extending to a radial edge of said body for connecting said sensor means to external circuitry.

10. The sensor set forth in claim 9 wherein said central and peripheral portions of said body have a common planar surface, said sensor means being positioned on said surface so as to be disposed within one of said cavities, said leads being on said surface and extending through an adjacent joint between said surface and one of said fittings.

11. The sensor set forth in claim 10 further comprising a housing externally surrounding said body and enclosing said body and at least a portion of said fittings, electrical terminal means on said housing and means connecting said terminal means to said leads.

12. The sensor set forth in claim 10 wherein said fittings are of identical construction, said necks extending coaxially with said axis.

13. The sensor set forth in claim 10 wherein said fittings are of PYREX ® glass composition.

* * * * *

UNITED STATES PATENT AND TRADEMARK OFFICE
CERTIFICATE OF CORRECTION

PATENT NO. : 5,001,934

DATED : March 26, 1991

INVENTOR(S) : Charles H. Tuckey

It is certified that error appears in the above-identified patent and that said Letters Patent is hereby corrected as shown below:

Col. 4, line 44, change "claim 10" to --claim 1--.

Col. 4, lines 55-56, delete "said peripheral portion and thinner than said peripheral portion,".

Col. 4, line 53, "impertorate" should read --imperforate--.

Signed and Sealed this

Seventeenth Day of November, 1992

Attest:

DOUGLAS B. COMER

*Attesting Officer*  *Acting Commissioner of Patents and Trademarks*